US006634206B2

(12) United States Patent
Cui et al.

(10) Patent No.: US 6,634,206 B2
(45) Date of Patent: Oct. 21, 2003

(54) METHOD FOR SYNCHRONIZING THE ZERO POSITION OF PEDAL POSITION SENSORS

(75) Inventors: Weijia Cui, Troy, MI (US); Gerald L Holbrook, Rochester Hills, MI (US); Binqiu Xu, Rochester Hills, MI (US); Gary K Lowe, Troy, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 95 days.

(21) Appl. No.: 10/007,710

(22) Filed: Nov. 8, 2001

(65) Prior Publication Data

US 2003/0084705 A1 May 8, 2003

(51) Int. Cl.[7] .............................................. G01M 19/00
(52) U.S. Cl. .......................................... 73/1.75; 73/1.79
(58) Field of Search .................................. 73/1.75–1.81

(56) References Cited

U.S. PATENT DOCUMENTS 5,157,956 A * 10/1992 Isaji et al. .................... 73/1.75

* cited by examiner

*Primary Examiner*—Robert Raevis
(74) *Attorney, Agent, or Firm*—Ralph E. Smith

(57) ABSTRACT

A method for synchronizing a plurality of pedal position sensors in a motor vehicle. A series of voltages are accumulated from each of a plurality of pedal position sensors. Representative voltages are determined from the series of voltages. The representative voltages are assigned to linear relationships from which an offset is determined.

23 Claims, 5 Drawing Sheets

METHOD FOR SYNCHRONIZING THE ZERO POSITION OF PEDAL POSITION SENSORS

BACKGROUND OF THE INVENTION

1. Field of the Invention

The present invention relates to synchronizing the voltage of position sensors, and more particularly to a method for synchronizing the zero position of a plurality of pedal position sensors in the automotive industry.

2. Background of the Invention

Position sensors are used to allow an electrical circuit to gain information about an event or a continuously varying condition. A type of position sensor is a potentiometric sensor. Potentiometric sensors are widely used as position sensors in various automotive applications. In particular, potentiometric sensors are used to obtain throttle and accelerator pedal position measurements.

With the introduction of electronically controlled engines, electronically controlled transmissions and electronic throttle control devices, a rotary potentiometer sensor is one type of sensor used for detecting the angular position or movement of the accelerator pedal.

Potentiometric sensors are used as voltage dividers, A voltage is applied across two extreme ends of a resistor. An intermediate tap is provided between the two extremes of the resistor. The tap is mechanically linked to the device which is to be sensed, and the position of the device is determined by the voltage at the intermediate tap.

The accelerator pedal position sensors detect the actual accelerator pedal position and outputs an accelerator pedal position signal to the electronic engine control unit (ECU) and the electronic automatic transmission controller (EATX), respectively. The ECU determines a target throttle position in response to the actual accelerator pedal position and other parameters representing engine driving conditions. The EATX translates the actual accelerator pedal position into the throttle angle in a similar way as the ECU does.

When an accelerator pedal position is requested by the driver, the ECU calculates the target throttle according to the request and sends the throttle related information to the EATX.

A common problem when applications include a plurality of sensors (pedal position sensors) is that the voltage may vary from sensor (pedal position sensor) to sensor (pedal position sensor) due to production variation even for a fixed pedal position. In the intended application, absence of synchronizing the zero position of the pedal position sensors, the EATX and the ECU would interpret a pedal angle request differently, thus the performance of the vehicle is hindered.

Therefore, this invention provides a more accurate and reliable method of ensuring that each automotive electronic controller is obtaining synchronized interpretation, or establishing a common reference point of the voltage from the pedal position sensors at any given pedal position.

SUMMARY OF INVENTION

The present invention overcomes the aforementioned disadvantages as well as other disadvantages. In accordance with the teachings of the present invention, the present invention provides a more accurate and reliable method of ensuring that the automotive electronic controllers are obtaining synchronized interpretation of the voltages when a plurality of pedal position sensors are present.

In a vehicle with Electronic Throttle Control (ETC), the accelerator pedal controls pedal position sensors (PPS) and according to the voltage from the PPS, the ECU controls the throttle opening. In a vehicle with an Engine control unit (ECU) and an Automatic Transmission Controller (EATX), the EATX and ECU may have independent PPS responding to the accelerator pedal. The voltage for a same pedal position may vary from PPS to PPS due to production variation, and the controllers may obtain different pedal positions from their own PPS. This hinders the performance of the vehicle.

In the present application, the ECU uses a predefined threshold that does not change with different PPS. The EATX also uses a threshold. In order to compensate for PPS production variations, a method has been developed to adapt the EATX threshold to achieve synchronization with the ECU threshold. Since in this application the ECU and EATX are separate modules and they communicate through a communication BUS with significant latency, this method also identifies the ECU and EATX PPS voltage readings (or their interpretations) that correspond to the same steady pedal positions.

It is an object of the invention to provide a method which is capable of synchronizing a plurality of pedal position sensors, providing the equal pedal angle information to the automotive electronic controllers regardless of the rotation angle of the pedal.

The ECU reads its PPS voltage ($PPS_1$) and compares it against a threshold. When the voltage is below the threshold, the ECU assumes a zero pedal requested throttle. The ECU computes a throttle opening from the difference between the voltage and the threshold when the read voltage is above the threshold. The ECU then controls the ETC to achieve the desired throttle and controls the engine accordingly.

The EATX reads a voltage from a different PPS ($PPS_3$) and compares it against its threshold. When this voltage is below the threshold, the EATX assumes a zero throttle. The EATX also computes a throttle from the difference between the voltage and the threshold when the voltage is above the threshold.

To best control the transmission, the EATX needs to be synchronized with the ECU on PPS voltage interpretation, or in other words, the threshold voltages of the EATX and ECU should correspond to the same pedal position. Then, the EATX and ECU will both interpret a zero or non-zero throttle from the same pedal position.

DETAILED DESCRIPTION OF THE INVENTION

Figure 1:
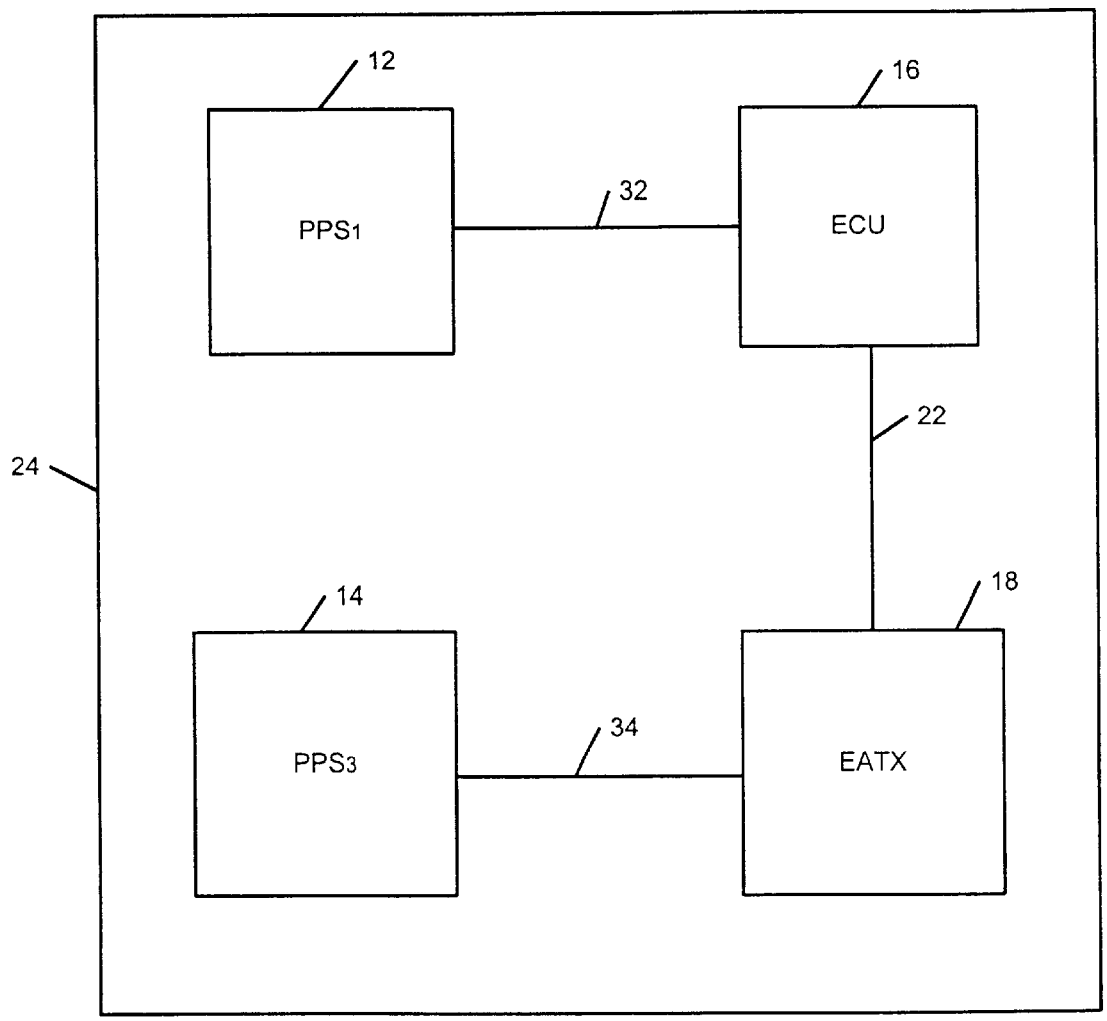
FIG. 1 is a block diagram representation of the pedal position sensors according to the present invention incorporated into a motor vehicle.

With initial reference to FIG. 1, a general configuration including first and second pedal position sensors $PPS_1$ and $PPS_3$ incorporated in a motor vehicle 24 is shown and identified at reference 12 and 14 respectively. Pedal position sensors 12 and 14 operatively connect to ECU 16 and EATX 18 through conductors 32 and 34 respectively. The EATX 18 is further configured to receive processed pedal data including pedal position percentage (PVS) from BUS 22.

Figure 2:
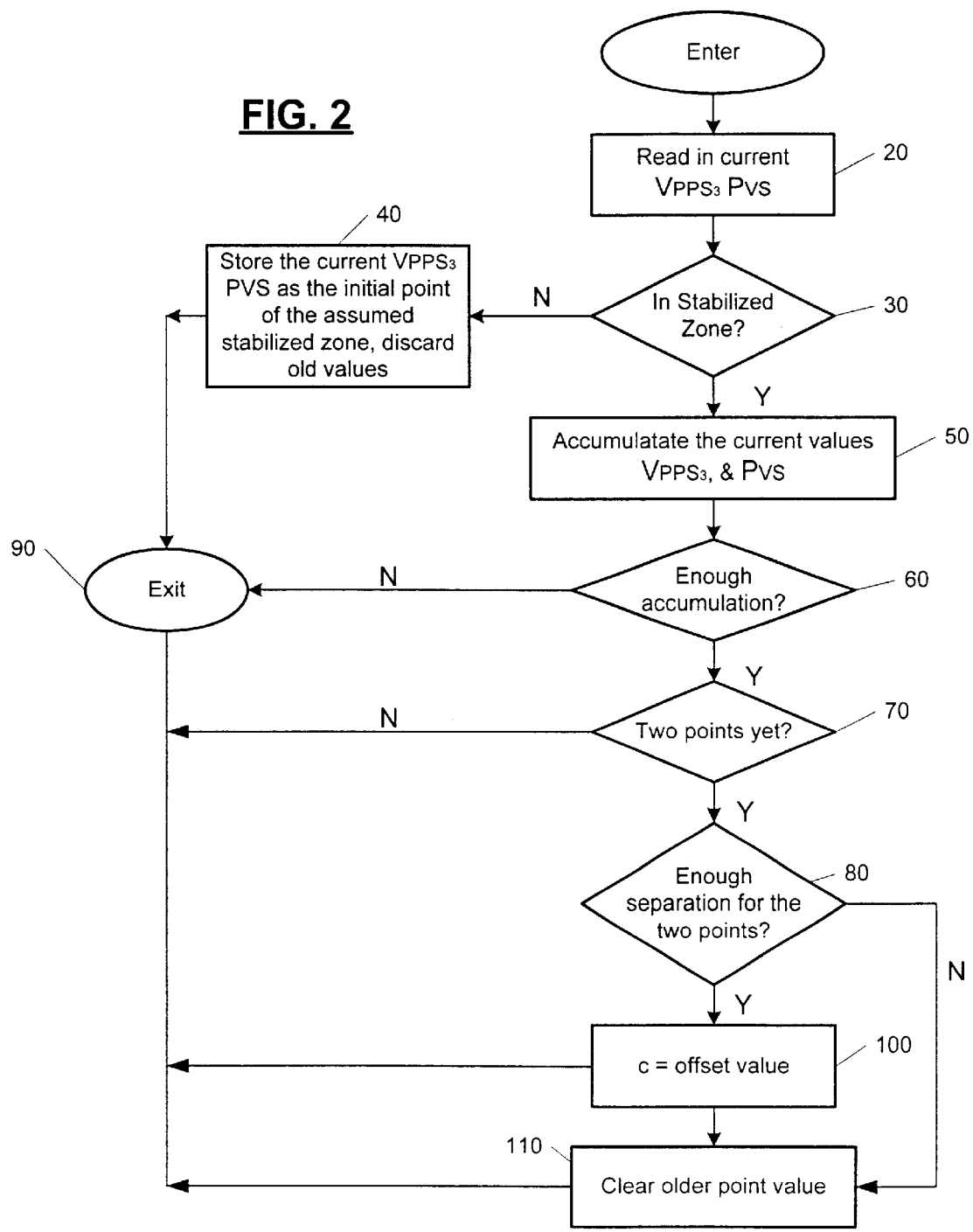
FIG. 2 shows the flow of the overall process steps to synchronize pedal positions sensors to zero position.

With continued reference to FIG. 1 and further reference to FIG. 2, the overall process steps to synchronize pedal position sensors 12 (PPS$_1$) and 14 (PPS$_3$) will be described. At block 20 the EATX 18 reads and stores the current pedal position sensor voltage (V$_{pps3}$) from its PPS$_3$ 14. The EATX 18 also reads the most recent engine PVS over the BUS 22. The PVS is calculated by the ECU from the pedal position sensor (PPS$_1$) reading, as will be described in greater detail, and transferred over the BUS 22. The ECU interprets a zero throttle (idle) for 0% PVS and interprets a non-zero throttle if PVS is greater than 0%. The EATX receives the PVS with the bus latency.

At decision block 30 it is determined if the PVS and V$_{pps3}$ are stabilized in responding to a stabilized pedal angle. To identify steady pedal angles, it is assumed that the PVS and V$_{PPS3}$ should be steady for a period of time with variation less than a predetermined tolerance. If so, then at block 50 an accumulation of values of both V$_{pps3}$ and PVS take place. If not, the current V$_{PPS3}$ and PVS are stored at block 40 as the initial point of the assumed stabilized zone and the old values are discarded, then, the program is exited at block 90.

At decision block 60 it is determined if enough values have been accumulated for the current steady pedal angle. Sufficient accumulation is defined by a repetitive pattern of values within a predetermined tolerance. The accumulation defines a pair of averaged PVS and V$_{pps3}$ to define a more representative steady pedal angle with less noise. If enough values have been accumulated, then at decision block 70 it is determined if an averaged pair of PVS and V$_{pps3}$ have already been defined for a previous steady pedal angle. If enough values have not been accumulated, the program exists at block 90. If the averaged pair of PVS and V$_{pps3}$ have been defined for two steady pedal angles the routine proceeds to block 80. It must then be determined at decision block 80 if there is adequate separation between the two steady pedal angle values in order to perform a valid computation. If so, then the offset value of c is calculated at block 100. As such, c is the value at which the EATX threshold must adapt to achieve synchronization. A mathematical development used to determine c will later be described in detail.

If there is not adequate separation, one pair of the accumulated V$_{pps3}$ and PVS (in the present application, the older pair) are cleared at block 110, the program exits and the process begins at enter. Once the offset value of c is determined at block 100, the oldest pair of values are cleared at block 110 and the program exists at block 90 and the entire process begins at enter.

Figure 3:
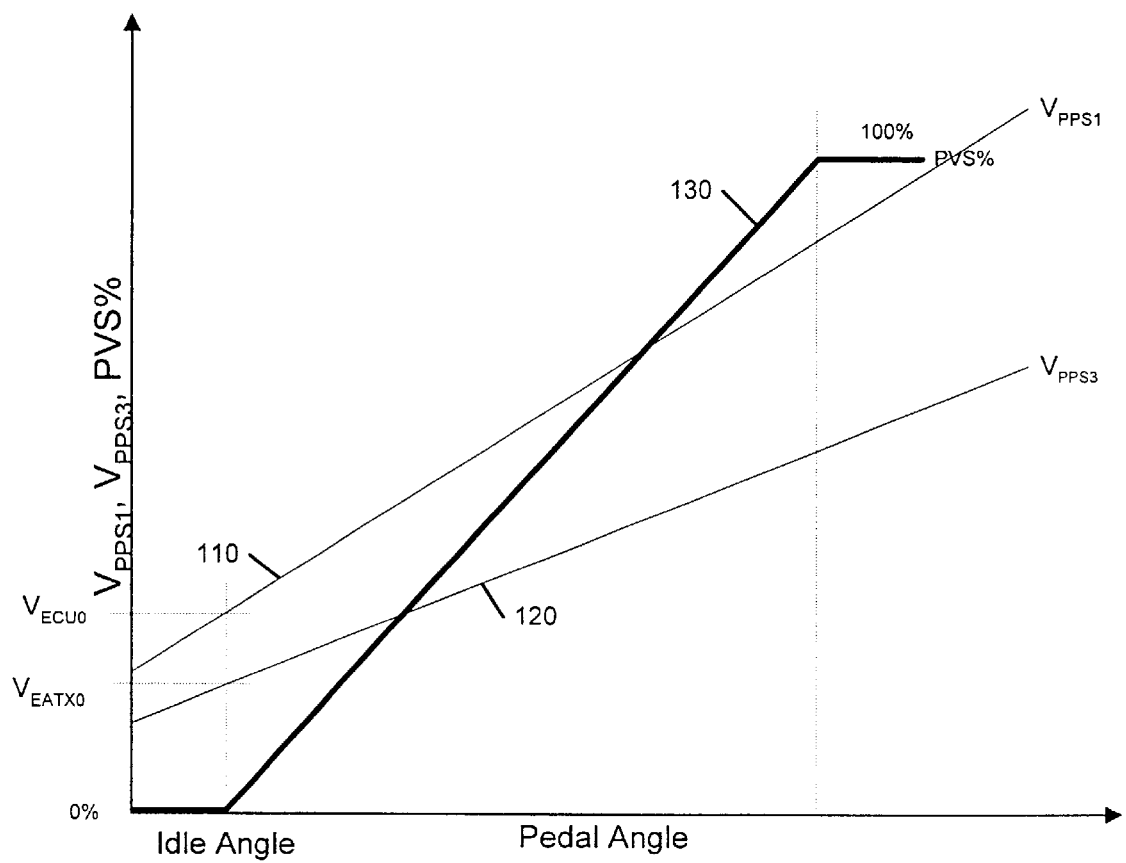
FIG. 3 is a graph representing the offset value required to synchronize the pedal position sensors.

Turning now to FIG. 3, voltage traces from the ECU and the EATX are shown. The horizontal axis represents pedal angle and the vertical axis represents voltage (V). Line 110 (V$_{pps1}$) is the voltage the ECU reads from pedal position sensor 12. Line 120 (V$_{pps3}$) is the voltage the EATX reads from pedal position sensor 14. Each voltage trace has a linear relation with the pedal angle. Idle angle is the pedal angle threshold used for interpreting non-zero throttle request. Any pedal angle less than the Idle angle is interpreted as a zero throttle request and any pedal angle greater than Idle angle is interpreted as a non-zero throttle request. The Idle angles are defined by V$_{ECU0}$ and V$_{EATX0}$ for the ECU and the EATX, respectively.

V$_{ECU0}$ is the threshold that the ECU uses to interpret non-zero throttle request from the pedal. V$_{EATX0}$ is the threshold that the EATX uses to interpret non-zero throttle request from the pedal. Any voltage value higher than its threshold voltage is interpreted as a non-zero throttle request by its controller, and any voltage values less than its threshold is interpreted as zero throttle request (idle). Due to production variation of the pedal position sensor assembly, the relation between the V$_{EATX0}$ and V$_{ECU0}$ is variable. If a fixed threshold value is used for either ECU or EATX (throughout this example, ECU is the fixed value), the other (EATX in this example) needs to identify its threshold such that the EATX and ECU read their respective threshold voltages at the same pedal angle (Idle angle).

The EATX interpretation of its pedal position sensor reading must be synchronized with engine pedal position percentage (PVS). In this regard, V$_{EATX0}$ is the value of the voltage (V$_{PPS3}$) the EATX read when the pedal is at the angle position that the value of the voltage (V$_{PPS1}$) the ECU read is V$_{ECU0}$. PVS, 130 is a linear translation of the voltage (V$_{PPS1}$) the ECU read from its pedal position sensor 14. It is defined as 0% when the voltage is at or lower than the lower threshold (V$_{ECU0}$) and is defined as 100% when the voltage is at or higher than a predefined upper threshold. The PVS, 130 vs. V$_{PPS3}$, 120 also has a linear relation when PVS, 130 is larger than 0% and less than 100%.

Figure 4:
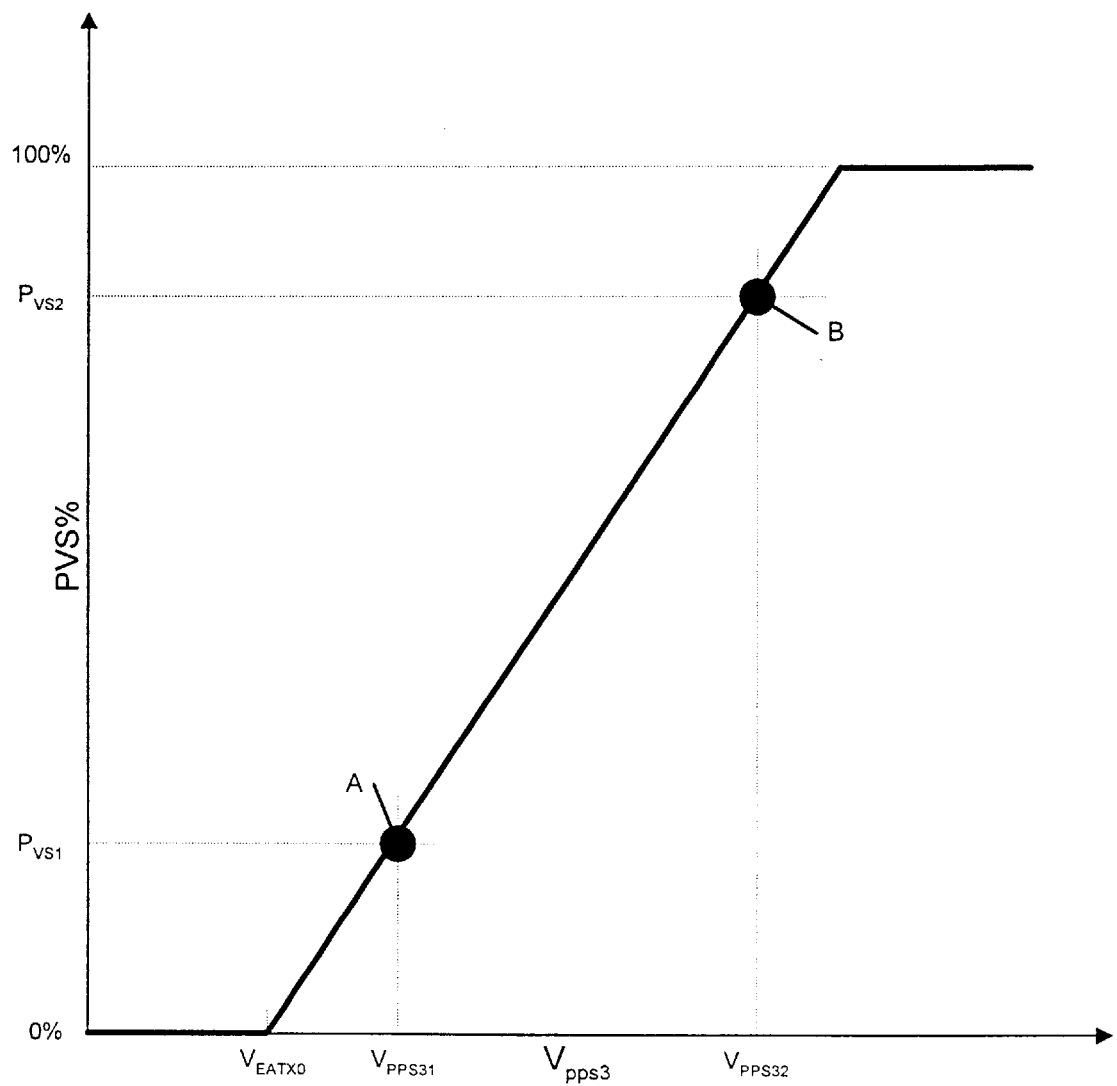
FIG. 4 is a graph of pedal position percentage versus pedal position sensor voltage.

FIG. 4 is a graph of the PVS vs. V$_{pps3}$. A and B are defined by the two pairs of the averaged PVS and V$_{pps3}$ for two steady pedal angles. The linear model of PVS versus V$_{pps3}$ is defined if A and B are obtained, provided PVS for both A and B is larger than 0% and less than 100%. V$_{pps3}$ preferably range from 0.64 to 4.8 volts. To satisfy the adequate separation requirement of block 80 in FIG. 2, the PVS values, P$_{VS1}$ and P$_{VS2}$, are preferably separated by at least 20%. Similarly, the V$_{PPS3}$ values, V$_{PPS31}$ and V$_{PPS32}$, are preferably separated by at least 1 volt. Then the V$_{EATX0}$ can be calculated from the linear model by setting PVS=0% in the model throughout an accumulation of points to determine the offset value c. Those skilled in the art will recognize that the separation requirements described herein may be varied without departing from the scope of the invention.

Figure 5:
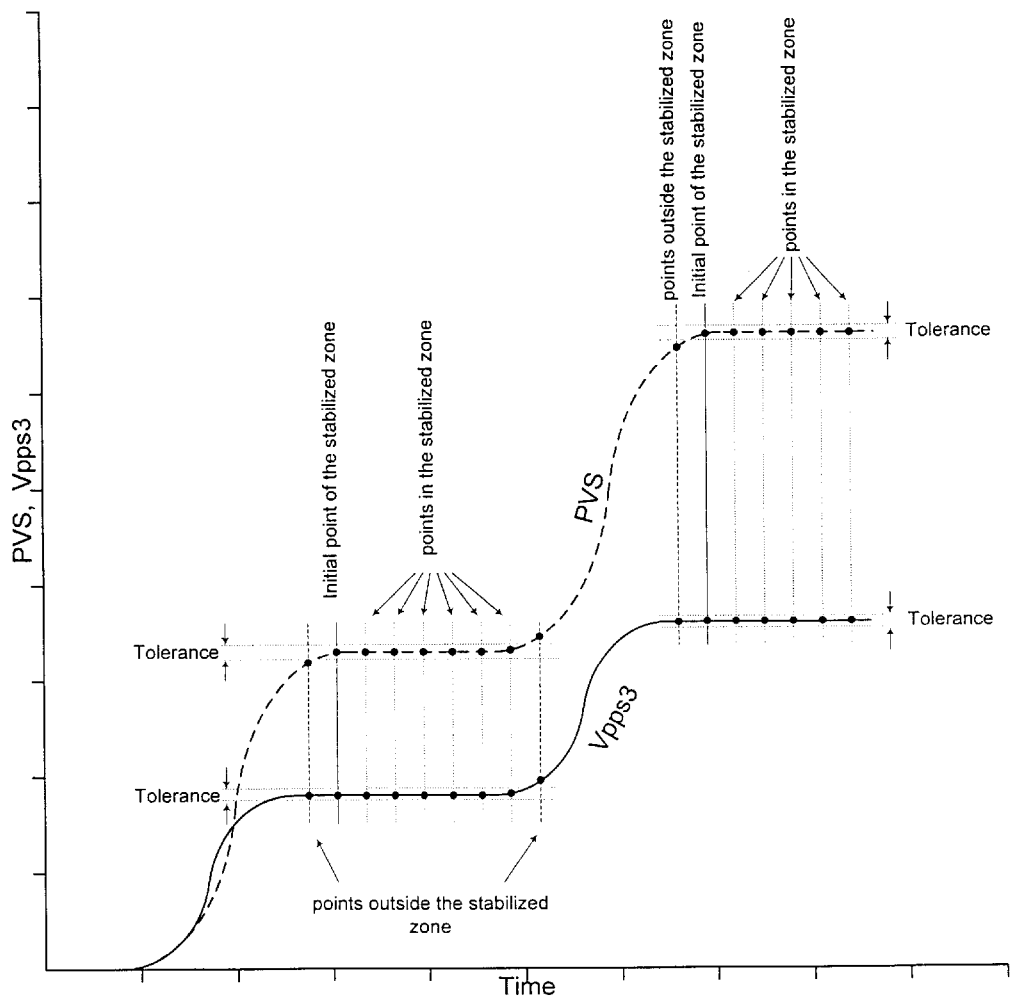
FIG. 5 is a graph of time traces of PVS and $V_{pps3}$ at varying pedal angles showing two steady pedal angles.

FIG. 5 shows the time traces of PVS and V$_{pps3}$ at varying pedal angles with two steady pedal angles. To identify the steady pedal angles, it is assumed that the PVS and V$_{pps3}$ should be steady for a period of time with variation less than a predefined tolerance. For example, the preferred maximum tolerance depicted in FIG. 5 is 59 millivolts for V$_{pps3}$ and 1.2% for PVS. Those skilled in the art will recognize that other tolerances may be employed while achieving similar results. A data pair (V$_{pps3}$, PVS) are stored as the initial point of an assumed stabilized period. Each time a new pair of PVS and V$_{pps3}$ are received and are within a tolerance of the initial point, they are considered stabilized PVS and V$_{pps3}$ corresponding to a steady pedal angle, and are accumulated. The accumulation process continues until an in-coming data pair is out of the tolerance with respect to the initial point, or a predefined number of data pairs have been accumulated. In the event that new data is out of tolerance, or enough data has been accumulated, the following new data will be saved as the new initial point again.

The following shows the detailed mathematical development of this invention. At the outset, the PPS voltages V$_{PPS1}$, V$_{PPS2}$, and V$_{PPS3}$ are linearly related to pedal angle:

$$V_{PPS1}=K1(\Pi)+b1 \quad (1)$$

$$V_{PPS2}=K2(\Pi)+b2 \quad (2)$$

$$V_{PPS3}=K3(\Pi)+b3 \quad (3)$$

Where $\Pi$=Pedal Angle, K1-K3=constants, b1b3=constants. The ECU reads $V_{PPS1}$ and $V_{PPS2}$ and performs the following calculation:

$$PVS=L*(V_{PPS1}-V_{ECU0}) \text{ for } V_{PPS1} \geq V_{ECU0} \quad (4)$$

$$PVS=0\% \text{ for } V_{PPS1}<V_{ECU0}$$

Limit PVS$\leq$100% where $V_{ECU0}$ is the ECU threshold for interpreting $V_{pps1}$. L is a constant defining pedal travel angle range to achieve 0% to 100% PVS. The EATX reads $V_{PPS3}$. As such, from equations (1) and (3), $V_{pps3}$ is linearly related to $V_{pps1}$. Equation (4) also shows linear relation between PVS and $V_{pps1}$. The following linear relations are established.

$$PVS=a*(V_{pps}-C) \text{ for } 0<PVS<100 \quad (5)$$

$$PVS=0\% \text{ with } V_{PPS1}<V_{ECU0}$$

In this regard, the linear model of Equation (5) defines the condition such that when Vpps3=c, PVS=0%. Thus, c should be the threshold the EATX uses to interpret Vpps3. If c is used as $V_{EATX0}$ the ECU 16 and EATX 18 will interpret a zero or non-zero throttle at a same pedal angle.

Referring now to FIG. 4, two averaged data pairs of PVS and Vpps3 are used to compute the constants in equation (5). Assuming the two data pairs (PVS1, $V_{pps31}$) and (PVS2, $V_{pps32}$), the following equations are established.

$$PVS1=a*(V_{PPS31}-c)$$

$$PVS2=a*(V_{PPS32}-c)$$

Solving for a and c yields:

$$a=(PVS1-PVS2)/(V_{PPS31}-V_{PPS32}) \quad (6)$$

$$c=-PVS1(V_{PPS31}-V_{PPS32})/(PVS1-PVS2)+V_{PPS31} \quad (7)$$

Thus, with two averaged data pairs of PVS and Vpps3 obtained for two different steady pedal angles, c can be calculated. Considering noises in the $V_{pps1}$ and $V_{pps3}$ signal, c is calculated only when there is enough separation between the two steady pedal angles which can be described as:

$$|V_{PPS31}-V_{PPS32}|>constant1 \text{ and } |PVS1-PVS2|>constant2$$

constant1 and constant2 defines the minimum separation between the two steady pedal angles. To further reduce the noise effect on synchronization, $V_{EATX0}$ is adapted to c with the following adaptive method $$V_{EATX0}=(V_{EATX0}+C)/2$$

The method incorporated herein adapts $V_{EATX0}$ to synchronize EATX interpretation of its PPS reading with $V_{ECU0}$ as a defined constant. Accordingly, a similar approach can be developed to adapt $V_{ECU0}$ with $V_{EATX0}$ as a defined constant.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for establishing a common reference point of a plurality of position sensors, said method comprising the steps of:

measuring a first and second voltage of a first and second position sensor respectively at a first time;

measuring a third and fourth voltage of said first and second position sensor respectively at a second time;

determining a position sensor offset from said first, second, third and fourth voltages; and correcting a position sensor voltage with said position sensor offset.

2. The method of claim 1, wherein said step of determining said position sensor offset further comprises the step of determining a linear relationship between said first and second voltage and a linear relationship between said third and fourth voltage.

3. The method of claim 1, further comprising the step of determining if said voltages of said first position sensor and said voltages of said second position sensor are within a predetermined tolerance.

4. The method of claim 3, wherein said predetermined tolerance of said voltages of said first position sensor is less than 59 millivolts.

5. The method of claim 3, wherein said predetermined tolerance of said voltages of said second position sensor is less than 1.2%.

6. The method of claim 1, further comprising the step of determining if said voltages of said first position sensor are separated by a predetermined amount from said voltages of said second position sensor.

7. The method of claim 6, wherein said first and third voltages are separated by at least 1 volt.

8. The method of claim 6, wherein said second and fourth voltages are separated by 20%.

9. The method of claim 1, wherein the plurality of position sensors include a plurality of pedal position sensors.

10. A method for establishing a common reference point of a plurality of position sensors, said method comprising the steps of:

measuring a first voltage value from a first and second position sensor;

calculating a relationship between said first voltages;

measuring a second voltage from a first and second position sensor;

calculating a relationship between said second voltages;

responsive to the relationship between said first voltages and said second voltages, determining a proper offset; and applying said offset to one of said first and second position sensor to establish the common reference point.

11. The method of claim 10, wherein said relationship between said first voltages is linear.

12. The method of claim 10, wherein said relationship between said second voltages is linear.

13. The method of claim 10, further comprising the step of determining if said first and second voltages of said first position sensor are separated a predetermined amount from said first and second voltages of said second position sensor.

14. The method of claim 13, wherein said first voltages of said first and second position sensor are separated by 1 volt.

15. The method of claim 13, wherein said second voltages of said first and second position sensor are separated by 20%.

16. The method of claim 10, wherein the plurality of position sensors include a plurality of pedal position sensors.

17. A method for establishing a common reference point of a plurality of position sensors, said method comprising the steps of:

measuring a first and second plurality of voltages from a first and second position sensor respectively;

assigning a first and second representative voltage to said first and second plurality of first and second voltages;

providing a relationship between said first and second representative voltages; and adapting said relationship to an accumulation of first and second representative voltages to determine the common reference point between said first and second position sensors.

18. The method of claim 17, wherein said first and second representative voltages include a first and second average of said first and second plurality of voltages.

19. The method of claim 17, further comprising the step of determining if said first and second representative voltages separated by a predetermined amount.

20. The method of claim 17, further comprising the step of determining if each of said first and second plurality of voltages are within a predetermined tolerance.

21. The method of claim 20, wherein said predetermined tolerance of said first plurality of voltages is less than 59 millivolts.

22. The method of claim 20, wherein said predetermined tolerance of said second plurality of voltages is less than 1.2%.

23. The method of claim 17, wherein the plurality of position sensors include a plurality of pedal position sensors.

* * * * *

UNITED STATES PATENT AND TRADEMARK OFFICE
CERTIFICATE OF CORRECTION

PATENT NO. : 6,634,206 B2
DATED : October 21, 2003
INVENTOR(S) : Weijia Cui et al.

It is certified that error appears in the above-identified patent and that said Letters Patent is hereby corrected as shown below:

<u>Title page,</u>
Item [*] Notice, should read -- Subject to any disclaimer, the term of this Patent is extended or adjusted under 35 U.S.C. 154(b) by 188 days --.

Signed and Sealed this

Eighteenth Day of May, 2004

JON W. DUDAS
*Acting Director of the United States Patent and Trademark Office*